United States Patent
Yue et al.

(10) Patent No.: US 9,749,057 B2
(45) Date of Patent: Aug. 29, 2017

(54) DETECTION AND ALIGNMENT OF XY SKEW

(71) Applicant: Juniper Networks, Inc., Sunnyvale, CA (US)

(72) Inventors: Yang Yue, Milpitas, CA (US); Bo Zhang, San Jose, CA (US); Robert C. Lofland, Sunnyvale, CA (US); Jason T. O'Neil, Fremont, CA (US); Qiang Wang, Union City, CA (US); Jon J. Anderson, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 18 days.

(21) Appl. No.: 14/816,977

(22) Filed: Aug. 3, 2015

(65) Prior Publication Data
US 2015/0341121 A1 Nov. 26, 2015

Related U.S. Application Data

(63) Continuation-in-part of application No. 13/730,193, filed on Dec. 28, 2012, now Pat. No. 9,184,834.

(51) Int. Cl.
*H04B 10/04* (2006.01)
*H04B 10/532* (2013.01)
*H04B 10/50* (2013.01)

(52) U.S. Cl.
CPC ....... *H04B 10/532* (2013.01); *H04B 10/5053* (2013.01); *H04B 10/5057* (2013.01)

(58) Field of Classification Search
CPC .............. H04B 10/532; H04B 10/5053; H04B 10/5057
(Continued)

(56) References Cited

U.S. PATENT DOCUMENTS

| 4,553,822 A | 11/1985 | Mahlein |
| 5,491,572 A | 2/1996 | Ohara |

(Continued)

FOREIGN PATENT DOCUMENTS

| EP | 2221999 | 8/2010 | |
| JP | 2002084230 | 3/2002 | |
| JP | WO 2012133472 A1 * | 10/2012 | ......... H04B 10/5057 |

OTHER PUBLICATIONS

Yue et al., "Detection and Compensation of XY Skew for Dual-Polarization Optical Quadrature Amplitude Transmitter using Reconfigurable Interference," 2015 IEEE Photonics Conference, 28th Annual Conference of the IEEE Photonics Society, Oct. 4-8, 2015, 2 pages.

(Continued)

*Primary Examiner* — Ken N Vanderpuye
*Assistant Examiner* — Amritbir Sandhu
(74) *Attorney, Agent, or Firm* — Harrity & Harrity, LLP

(57) ABSTRACT

An optical device may include a modulator. The modulator may receive an optical signal. The modulator may modulate the optical signal to include a first channel and a second channel. The modulator may modulate the optical signal based on a training pattern associated with detecting a skew. The modulator may cause the first channel to interfere with the second channel. The modulator may perform a power measurement on the first channel and the second channel. The modulator may determine the skew based on the power measurement and the training pattern. The modulator may time delay the first channel or the second channel to align the skew based on the skew.

20 Claims, 12 Drawing Sheets

(58) Field of Classification Search
USPC .......................................... 398/184, 198, 30
See application file for complete search history.

(56) References Cited

U.S. PATENT DOCUMENTS

| | | | | |
|---|---|---|---|---|
| 7,359,407 | B1* | 4/2008 | Mattos | H04L 25/14 370/509 |
| 7,639,945 | B2 | 12/2009 | Tamura | |
| 7,733,193 | B2 | 6/2010 | Kershteyn et al. | |
| 7,734,188 | B2 | 6/2010 | Kuwata | |
| 7,962,043 | B2 | 6/2011 | Conroy | |
| 7,970,285 | B2 | 6/2011 | Conroy | |
| 8,116,635 | B2* | 2/2012 | Tanimura | H04B 10/505 398/184 |
| 8,249,463 | B2* | 8/2012 | Perkins | H04B 10/5053 398/152 |
| 8,428,183 | B2 | 4/2013 | Khatana et al. | |
| 8,565,621 | B2* | 10/2013 | Ibragimov | H04B 10/616 398/204 |
| 8,644,420 | B2 | 2/2014 | Khatana et al. | |
| 8,855,498 | B2 | 10/2014 | Tanaka | |
| 8,929,745 | B2 | 1/2015 | Yamazaki | |
| 9,020,363 | B2* | 4/2015 | Yasuda | H04B 10/50575 398/183 |
| 9,184,834 | B1 | 11/2015 | Zhang et al. | |
| 9,240,843 | B1* | 1/2016 | Malouin | H04B 10/616 |
| 2002/0003641 | A1* | 1/2002 | Hall | H04B 10/532 398/65 |
| 2002/0118424 | A1 | 8/2002 | Miki et al. | |
| 2002/0191260 | A1* | 12/2002 | Bergano | H04B 10/532 398/183 |
| 2003/0184838 | A1 | 10/2003 | Akiyama | |
| 2005/0213104 | A1* | 9/2005 | Fuchs | G01J 4/04 356/491 |
| 2006/0291867 | A1 | 12/2006 | Tamura | |
| 2007/0058989 | A1 | 3/2007 | Kaku | |
| 2008/0175586 | A1 | 7/2008 | Perkins | |
| 2008/0175589 | A1* | 7/2008 | Perkins | H04J 14/02 398/34 |
| 2008/0181620 | A1* | 7/2008 | Sasaki | H04B 10/5561 398/198 |
| 2009/0047028 | A1* | 2/2009 | Terahara | G02F 1/0121 398/188 |
| 2009/0086303 | A1* | 4/2009 | Ide | H04B 10/5561 359/279 |
| 2009/0115544 | A1 | 5/2009 | Kershteyn | |
| 2009/0148170 | A1 | 6/2009 | Perkins | |
| 2009/0269080 | A1* | 10/2009 | Akiyam | H04B 10/5051 398/188 |
| 2009/0324253 | A1 | 12/2009 | Winzer | |
| 2009/0324257 | A1 | 12/2009 | Murakami et al. | |
| 2010/0021182 | A1* | 1/2010 | Asano | H04B 10/5561 398/188 |
| 2010/0080569 | A1* | 4/2010 | Xu | H04B 10/5053 398/152 |
| 2010/0080570 | A1* | 4/2010 | Conroy | H04B 10/5057 398/154 |
| 2010/0119239 | A1 | 5/2010 | Wang | |
| 2011/0274436 | A1* | 11/2011 | McNicol | H04B 10/5561 398/140 |
| 2011/0293276 | A1* | 12/2011 | Takahara | H04B 10/5053 398/65 |
| 2012/0008963 | A1 | 1/2012 | Aruga | |
| 2012/0020660 | A1* | 1/2012 | Le Taillandier De Gabory | H04B 10/0775 398/25 |
| 2012/0039421 | A1* | 2/2012 | Chrabieh | H04L 27/3863 375/340 |
| 2012/0128357 | A1 | 5/2012 | Mukai | |
| 2012/0183294 | A1 | 7/2012 | Boertjes et al. | |
| 2012/0189319 | A1 | 7/2012 | Mo et al. | |
| 2012/0224847 | A1 | 9/2012 | Ibragimov | |
| 2012/0237202 | A1* | 9/2012 | Abe | H04B 10/616 398/16 |
| 2012/0250792 | A1* | 10/2012 | Khatana | H04B 10/5053 375/308 |
| 2012/0250793 | A1* | 10/2012 | Khatana | H04L 27/364 375/308 |
| 2012/0263456 | A1* | 10/2012 | Tanaka | H04B 10/5055 398/25 |
| 2012/0263468 | A1 | 10/2012 | Yaman | |
| 2012/0308240 | A1 | 12/2012 | Akiyama | |
| 2013/0004158 | A1* | 1/2013 | Goldfarb | H04B 10/6161 398/25 |
| 2013/0216220 | A1* | 8/2013 | Yamanaka | H04B 10/5053 398/38 |
| 2013/0266045 | A1 | 10/2013 | Lakkis | |
| 2014/0010530 | A1* | 1/2014 | Goebuchi | H04B 10/5057 398/25 |
| 2014/0023368 | A1* | 1/2014 | Bhandare | H04J 14/06 398/65 |
| 2014/0072313 | A1* | 3/2014 | Yamazaki | H04B 10/5053 398/188 |
| 2014/0133868 | A1 | 5/2014 | Krause | |
| 2014/0178065 | A1 | 6/2014 | Mertz et al. | |
| 2014/0205280 | A1* | 7/2014 | Choe | H04B 10/0779 398/25 |
| 2014/0212136 | A1* | 7/2014 | Akiyama | H04B 10/2513 398/65 |
| 2014/0233084 | A1* | 8/2014 | Ono | G02F 1/01 359/279 |
| 2015/0063825 | A1* | 3/2015 | Yamase | H04B 10/5053 398/154 |
| 2015/0244468 | A1* | 8/2015 | Mak | H04B 10/5055 398/184 |
| 2015/0333835 | A1 | 11/2015 | Matsukawa | |
| 2016/0020853 | A1 | 1/2016 | Akiyama | |

OTHER PUBLICATIONS

Yue et al., "IQ Skew Monitoring and Alignment of Optical Quadrature Amplitude Transmitter using Reconfigurable Interference," 2014 Conference on Lasers and Electro-Optics, Jun. 8-13, 2014, 2 pages.

Tao et al., "Simple, Robust, and Wide-Range Frequency Offset Monitor for Automatic Frequency Control in Digital Coherent Receivers," Conference on Optical Fiber communication/National Fiber Optic Engineers Conference, Feb. 24-28, 2008, 2 pages.

Kikuchi, "Chapter 2, Coherent Optical Communications: Historical Perspectives and Future Directions," High Spectral Density Optical Communication Technologies, Optical and Fiber Communications Reports 6, 2010, pp. 11-49.

Rasmussen et al., "Digital Coherent Receiver Technology for 1 00-Gb/s Optical Transport Systems" Fujitsu Sci. Tech. J., vol. 46, No. 1, Jan. 2010, pp. 63-71.

Faruk et al., "Compensation for In-Phase/Quadrature Imbalance in Coherent-Receiver Front End for Optical Quadrature Amplitude Modulation," IEEE Photonics Journal, vol. 5, No. 2, Apr. 2013, 11 pages.

Yue et al., co-pending U.S. Appl. No. 15/264,239, entitled "Detection and Compensation of Power Imbalances for a Transmitter", filed Sep. 13, 2016, 37 pages.

European Search Report for European Application No. 16155277.3; issued Dec. 19, 2016, 11 pages.

* cited by examiner

DETECTION AND ALIGNMENT OF XY SKEW

RELATED APPLICATION(S)

This application is a continuation-in-part (CIP) of U.S. patent application Ser. No. 13/730,193, filed on Dec. 28, 2012, the content of which is incorporated by reference herein in its entirety.

BACKGROUND

An optical transmitter may use a variety of modulation techniques to modulate an optical signal to carry information. Polarization multiplexing (PM) is a modulation technique where two independent electrical data signals are modulated onto an optical carrier wave having orthogonal polarizations (e.g., an X channel polarization and a Y channel polarization) so that the overall data throughput is doubled without doubling the spectral bandwidth. Quadrature amplitude modulation (QAM) is a modulation technique where two or more binary or multi-level electrical data signals are modulated, via an in-phase, or "I" channel, and a quadrature (90 degree) phase, or "Q" channel, onto a single optical carrier wave such that both the amplitude and the phase of the optical carrier wave are modulated with data to enhance the efficiency of the spectral occupancy. An optical modulator may combine two different signals, each with an I channel and a Q channel, into a single signal with an XI channel, an XQ channel, a YI channel and a YQ channel, thereby improving spectral efficiency relative to a single signal.

SUMMARY

According to some implementations, an optical device may include a transmitter to provide an optical signal. The optical device may include a modulator. The modulator may include two or more tributary modulators to modulate an X polarization channel (X channel) and a Y polarization channel (Y channel) of the optical signal with a training pattern. The modulator may include the X channel including an in-phase channel (XI channel) and a quadrature channel (XQ channel). The modulator may include the Y channel including an in-phase channel (YI channel) and a quadrature channel (YQ channel). The modulator may include an interference device to cause the X channel to interfere with the Y channel. The modulator may include a detector to determine an optical power measurement of the optical signal after the X channel interferes with the Y channel. The optical device may include a controller. The controller may generate a control signal to align a skew associated with the optical signal based on the optical power measurement. The controller may provide the control signal to a tributary modulator, of the two or more tributary modulators, to alter a modulation of the optical signal.

According to some other implementations, a device may include an optical source. The device may include a parent modulator. The parent modulator may include an X polarization channel (X channel) modulator. The parent modulator may include a Y polarization channel (Y channel) modulator. The parent modulator may include an interference device. The parent modulator may include a detector. The parent modulator may include a control device.

According to some other implementations, an optical device may include a modulator. The modulator may receive an optical signal. The modulator may modulate the optical signal to include a first channel and a second channel. The modulator may modulate the optical signal based on a training pattern associated with detecting a skew. The modulator may cause the first channel to interfere with the second channel. The modulator may perform a power measurement on the first channel and the second channel. The modulator may determine the skew based on the power measurement and the training pattern. The modulator may time delay the first channel or the second channel to align the skew based on the skew.

DETAILED DESCRIPTION

Figure 1:
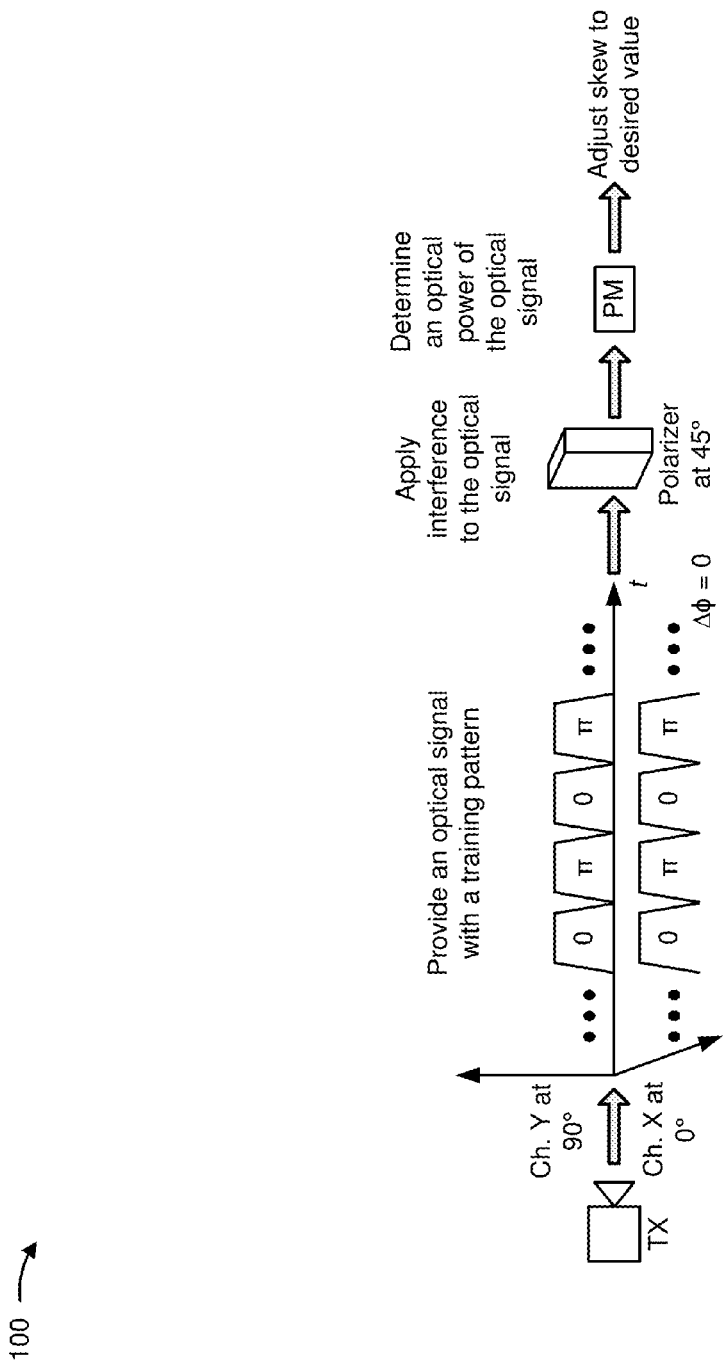
FIG. 1 is a diagram of an overview of an example implementation described herein.

The following detailed description of example implementations refers to the accompanying drawings. The same reference numbers in different drawings may identify the same or similar elements.

An optical modulator may be used to convert an electrical signal into an optical representation of the electrical signal. An optical modulator may use polarization multiplexing to modulate an optical carrier wave to transmit information. Polarization multiplexing (PM) is a modulation technique where an optical carrier wave may have different optical polarizations (e.g., may oscillate with a particular polarization or electromagnetic orientation) that are independently and simultaneously modulated via electrical signals (e.g., information and/or data). The different polarizations may include a first polarization channel, "X channel," and a second polarization channel, "Y channel," and the X channel and the Y channel may be orthogonal (or approximately orthogonal) to one another. For example, the X channel may be horizontally polarized light, and the Y channel may be vertically polarized light. However, the X and Y channels need not be horizontal and vertical polarizations, and need not be orthogonal.

An optical modulator may also use quadrature amplitude modulation to modulate an optical carrier wave to transmit information. Quadrature amplitude modulation (QAM) is a modulation technique where two or more binary or multi-level electrical data signals are modulated, via an in-phase, or "I" channel, and a quadrature (90 degree or approximately 90 degree) phase, or "Q" channel, onto a single optical carrier wave such that both its amplitude and phase are modulated with data to enhance the efficiency of the spectral occupancy. In m-ary QAM (mQAM or M-QAM), one symbol may represent multiple bits to enhance spectral efficiency. For example, modulation using 16-QAM can carry 4 bits per symbol, modulation using 64-QAM can carry 6 bits per symbol, etc. Generally speaking, a transmission modulated using M-QAM can carry $\log_2(M)$ bits per symbol. Other modulation techniques include binary phase-shift keying (BPSK), quadrature phase-shift keying (QPSK), differential quadrature phase-shift keying (DQPSK), and on-off keying (OOK).

An optical modulator may utilize polarization multiplexing to combine two different QAM signals into a dual-polarization QAM (DPQAM) signal with an in-phase horizontal polarization, or "XI" channel, a quadrature horizontal polarization, or "XQ" channel, an in-phase vertical polarization, or "YI" channel, and a quadrature vertical polarization, or "YQ" channel, thereby improving spectral efficiency relative to a single QAM signal. Similarly, an optical modulator may utilize polarization multiplexing to combine two different QPSK signals into a dual-polarization QPSK (DPQPSK), thereby improving spectral efficiency relative to a single QPSK signal.

However, during propagation of an optical signal (e.g., a DPQAM signal, a DPQPSK signal, or the like), a polarization skew (e.g., an XY skew) may occur between the X channels of the optical signal (e.g., the XI channel and the XQ channel) and the Y channels of the optical signal (e.g., the YI channel and the YQ channel). A skew may refer to a time misalignment between two or more channels. For example, a first channel may be misaligned to a second channel by a particular period of time (e.g., 1 picosecond (ps), 10 ps, 100 ps, etc.), resulting in a symbol of the first channel arriving at a receiver at a different time than a symbol of the second channel. The quantity of symbols that are received in the first channel after a particular symbol of the first channel and before a corresponding symbol of the second channel may be termed a quantity of unit intervals (UIs). For example, an optical signal where two symbols of a first channel are received before a corresponding symbol of a second channel may be described as having 2-UI skew or multi-UI skew. Similarly, an optical signal where one symbol of the first channel is received before a corresponding symbol of the second channel may be described as having 1-UI skew or single-UI skew. Similarly, an optical signal where 0.5 symbols of the first channel are received a corresponding symbol of a second channel may be described as having 0.5-UI skew or sub-UI skew.

When uncompensated (e.g., when the optical signal remains skewed), XY skew may degrade network performance for a coherent optical system. A digital communications analyzer may be utilized to perform XY skew detection for an optical system, but may be unnecessarily large, expensive, and/or necessitate excessive power consumption. Implementations, described herein may facilitate skew determination and alignment for XY skew of a dual-polarization optical signal using configurable interference. In this way, a modulator may perform data decoding of a dual-polarization signal for a long-haul communications system at low cost, power consumption, and using small-scale optical devices relative to utilizing a digital communications analyzer for skew detection and alignment.

FIG. 1 is a diagram of an overview of an example implementation 100 described herein. FIG. 1 shows a conceptual block diagram of skew detection and alignment based on reconfigurable interference. A transmitter device (e.g., "TX"), of an optical device, may generate an optical signal. For example, the transmitter device may generate an optical signal using dual polarization modulation, such as a DPQPSK optical signal, a DPQAM optical signal, or the like, with a particular type of waveform (e.g., a rectangular waveform, a sinusoidal waveform, etc.). The transmitter device may generate the optical signal with a training pattern, such as a pseudo-random bit sequence (PRBS), a periodic pattern (e.g., an "m0m1" pattern, such as a " . . . 0, $\pi$, 0, $\pi$, . . . " type pattern for a phase modulated signal with m=1), or the like.

The training pattern may be selected based on a quantity of UI skew, for which the optical device is compensating. For example, the optical device may provide an "m0m1" pattern with m=1 for detecting less than 2-UI skew, the "m0m1" pattern with m=2 for detecting less than 4-UI skew, or the like. The training pattern is encoded in the optical signal for a first tributary channel of an X component (e.g., an XI channel or an XQ channel) of the optical signal and is encoded in the optical signal for a second tributary channel of a Y component (e.g., a YI tributary channel or a YQ tributary channel) of the optical signal. A tributary channel may refer to a sub-channel of another channel, such as the XI channel and the XQ channel for the X channel or the YI channel and the YQ channel for the Y channel.

The optical device may modulate the optical signal and provide the optical signal to a polarization device, of the optical device, such as a polarization beam combiner, a polarizer, a polarization rotator, or the like. For example, the optical device may provide the optical signal to a polarizer that is configured to cause the first tributary channel to interfere with the second tributary channel when the first tributary channel and the second tributary channel are combined into a combined optical signal. The polarizer may be configured to a particular angle with regards to the X channel and the Y channel, such as a 45 degree angle, an approximately 45 degree angle, or the like. A power measurement device, of the optical device, such as a power monitor ("PM"), a photodetector, or the like, may determine an optical power of the combined optical signal. The optical device may determine an XY skew for the X channel and the Y channel based on the optical power of the combined optical signal. For example, the optical device may compare the optical power to a look-up table storing expected optical powers for a particular training pattern at one or more skews. The optical device may generate a control signal to adjust the skew to a desired value. For example, the optical device may generate a control signal, which is associated with causing a delay to one of the X channel or the Y channel, to reduce the skew.

In this way, an optical device may utilize configurable interference to determine an XY skew value for an optical signal and may reduce the XY skew value based on generating a control signal.

Figure 2:
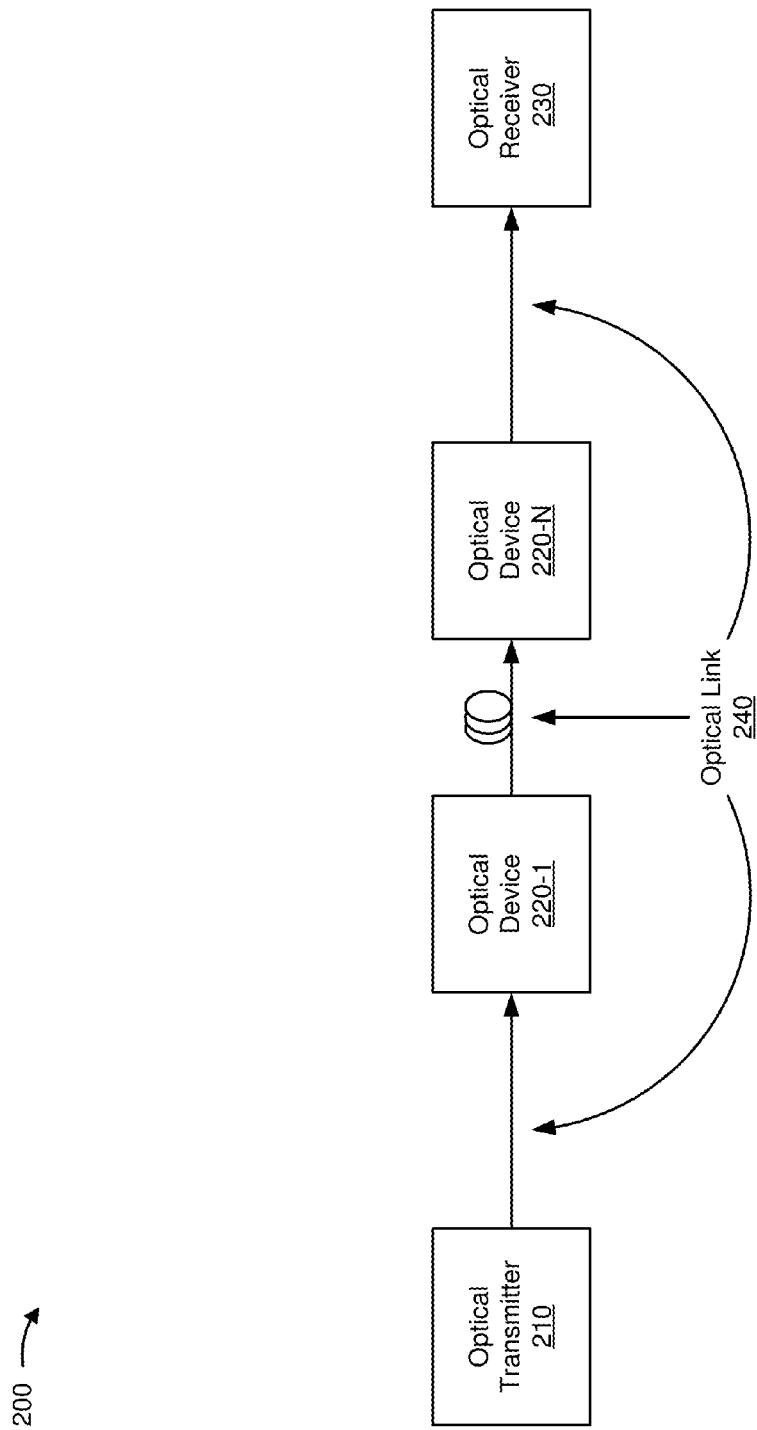
FIG. 2 is a diagram of an example environment in which systems and/or methods, described herein, may be implemented.

FIG. 2 is a diagram of an example environment 200 in which systems and/or methods described herein may be implemented. As illustrated, environment 200 may include an optical transmitter 210, one or more optical devices 220-1 through 220-N (N≥1) (hereinafter referred to individually as "optical device 220," and collectively as "optical devices 220"), an optical receiver 230, and an optical link 240.

Optical transmitter 210 may include a device capable of producing and/or transmitting an optical signal, such as an optical transmitter and/or an optical transceiver. For example, optical transmitter 210 may include a laser diode, a semiconductor laser, a continuous wave laser, and/or an optical modulator that may receive an electrical signal, and modulate, based on the electrical signal, an optical signal for transmission over optical link 240. Additionally, or alternatively, optical transmitter 210 may include a device capable of modulating an optical signal, such as an optical modulator, an electrical modulator, or the like. In some implementations, optical transmitter 210 may include a device capable of controlling properties associated with an optical signal and/or a modulator. Additionally, or alternatively, optical transmitter 210 may include an optical receiver, such as a photodetector, associated with performing a measurement on an optical signal to control properties associated with the optical signal and/or a modulator. In some implementations, optical transmitter 210 may generate an optical signal that is associated with a particular type of waveform, such as a rectangular waveform, a sinusoidal waveform, or the like.

Optical device 220 may include one or more optical traffic processing and/or optical traffic transfer devices, such as an optical node, an optical add-drop multiplexer ("OADM"), a reconfigurable optical add-drop multiplexer ("ROADM"), an optical multiplexer, an optical demultiplexer, an optical transmitter, an optical receiver, an optical transceiver, a photonic integrated circuit, an integrated optical circuit, a wavelength selective switch, a free space optics device, a computer, a server, a router, a bridge, a gateway, a modem, a firewall, a switch, a network interface card, a hub, and/or another type of device capable of processing and/or transferring optical traffic. Optical device 220 may process an optical signal and/or transmit an optical signal to another optical device 220 (and/or to optical receiver 230) via optical link 240.

Optical receiver 230 may include a device capable of receiving an optical signal, such as an optical receiver and/or an optical transceiver. For example, optical receiver 230 may include a photodetector and/or a photodiode that may detect an optical signal received via optical link 240, and may convert the optical signal into an electrical signal. Additionally, or alternatively, optical receiver 230 may include a device capable of de-modulating an optical signal. In some implementations, optical receiver 230 may include a device capable of controlling properties associated with an optical signal and/or a de-modulator.

Optical link 240 may include a medium capable of carrying optical signals. For example, optical link 240 may include an optical fiber that interconnects optical transmitter 210, optical devices 220, and optical receiver 230.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
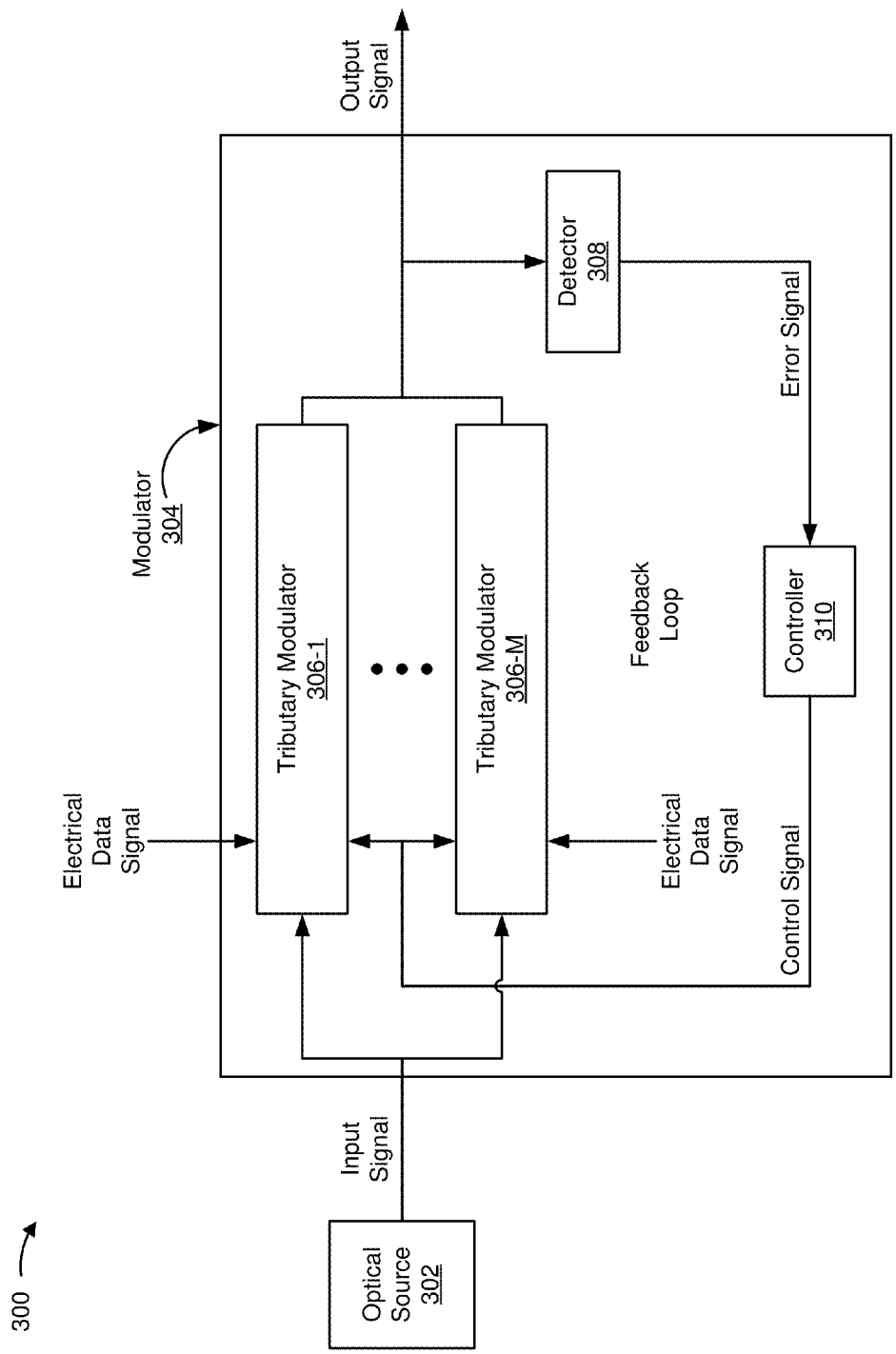
FIGS. 3A-3C are diagrams of example components of one or more devices of FIG. 2.
Figure 3B:
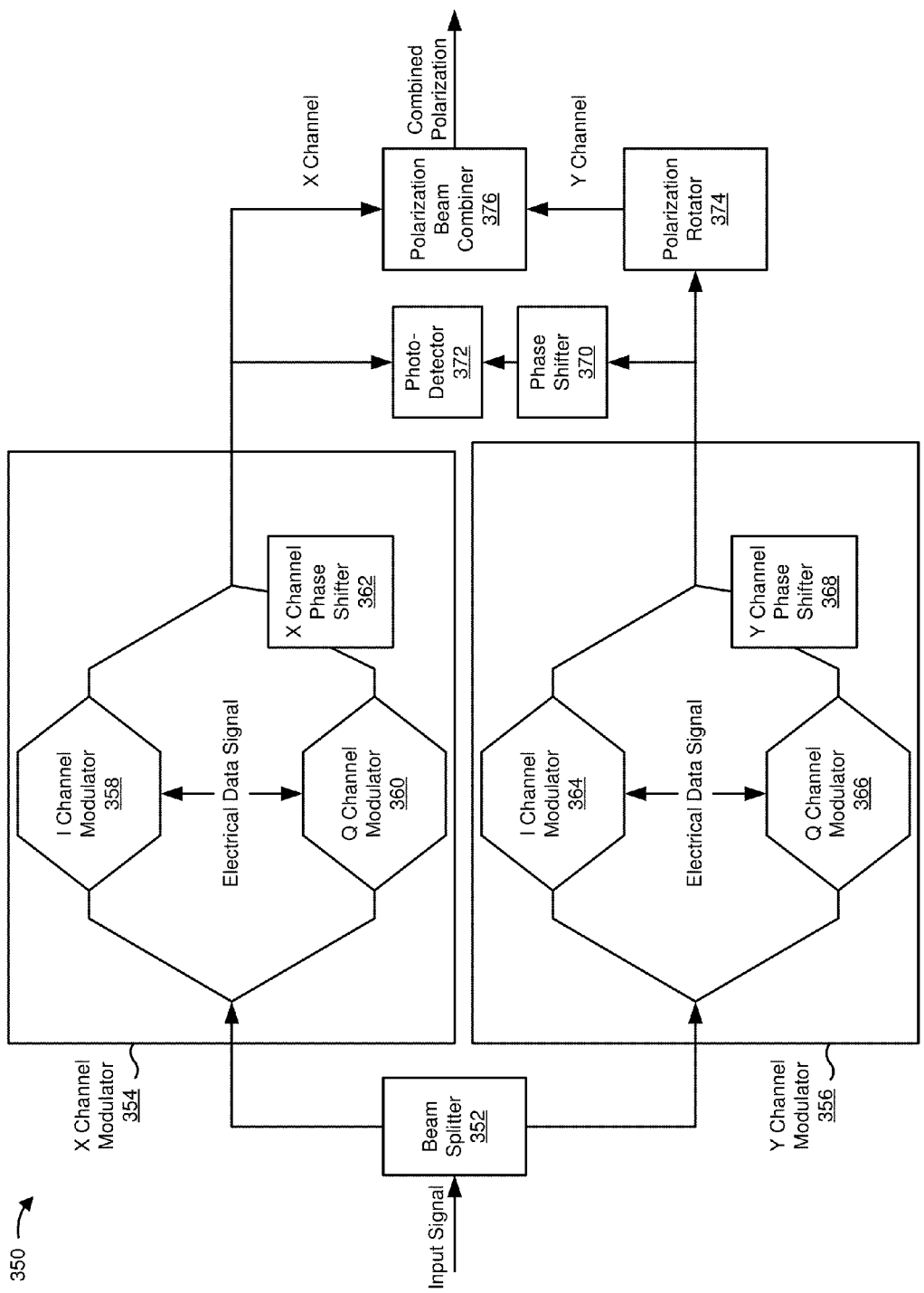
Figure 3C:
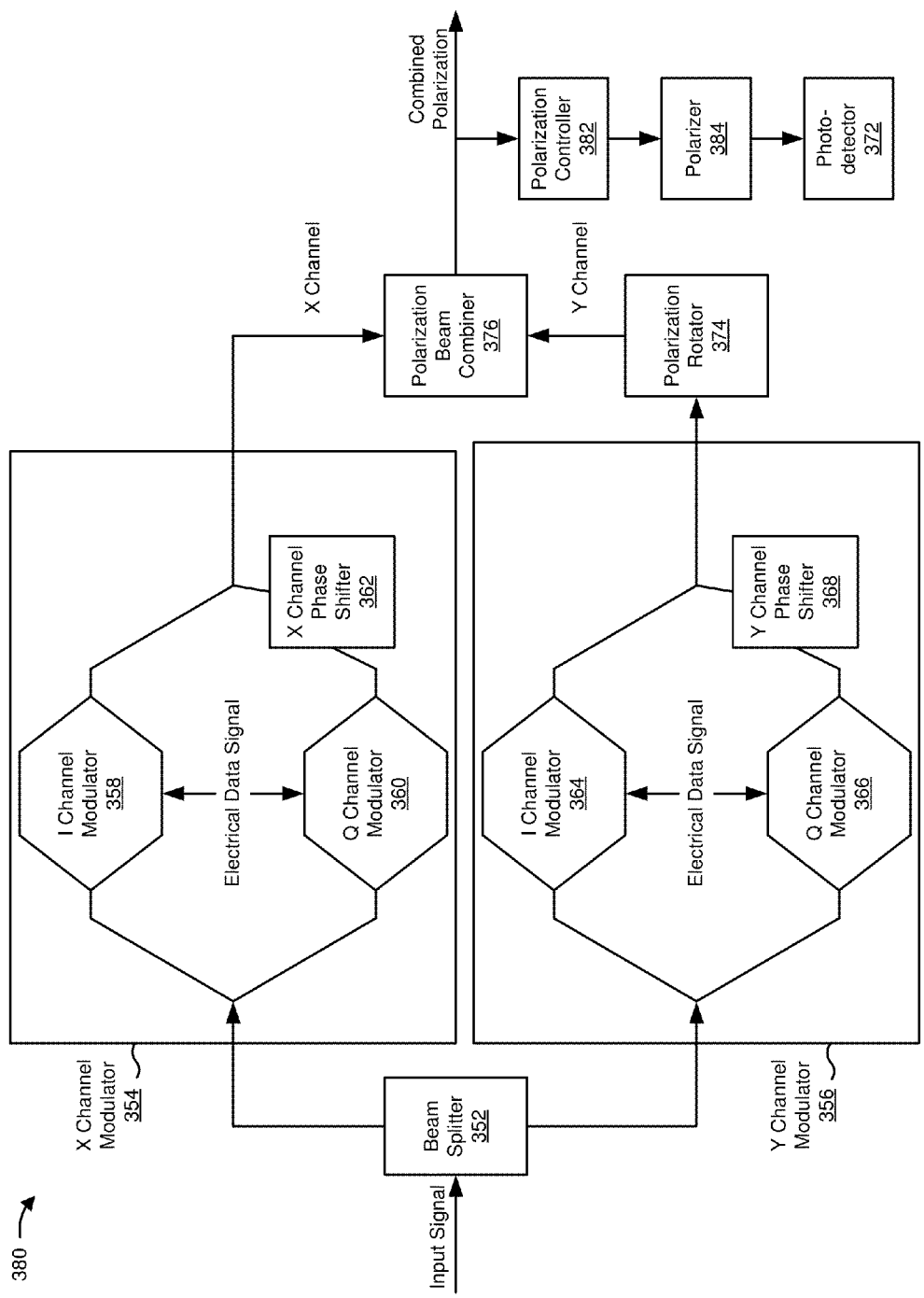

FIGS. 3A-3C are diagrams of example devices relating to optical transmitter 210. FIG. 3A shows an example of a device 300, which may correspond to optical transmitter 210. Device 300 may include an optical source 302 and a modulator 304. Modulator 304 may include a set of tributary modulators 306-1 through 306-M (M≥1) (hereinafter referred to individually as "tributary modulator 306," and collectively as "tributary modulators 306"), a detector 308, and a controller 310.

Optical source 302 may include a device capable of producing and/or transmitting an optical signal. For example, optical source 302 may include a laser diode, a semiconductor laser, and/or a continuous wave laser.

Modulator 304 may include a device capable of generating an optical signal. For example, modulator 304 may produce a modulating signal, which may vary one or more properties (e.g., amplitude/intensity, phase, frequency/wavelength, polarization, etc.) of a carrier signal (e.g., a carrier wave) produced by optical source 302. In some implementations, modulator 304 may include a polarization splitter, a polarization combiner, and/or a polarization rotator. Additionally, or alternatively, modulator 304 may include an indium phosphide semiconductor-based modulator. Additionally, or alternatively, modulator 304 may include a Mach-Zehnder ("MZ") modulator, an electro-absorption modulator, a phase modulator, an intensity modulator (e.g., an OOK modulator), a return to zero (RZ) modulator, a non-return to zero (NRZ) modulator, a PSK modulator, a BPSK modulator, a QPSK modulator, a QAM modulator, an M-QAM modulator, any polarization multiplexed (PM) versions of the above listed modulators (e.g., a DPBPSK modulator, a DPQAM modulator, or the like), and/or any other modulator or combination of modulators.

Tributary modulator 306 may include a device and/or circuitry capable of modulating an optical signal. For example, tributary modulator 306 may receive an input signal from optical source 302, and may modulate the input signal with an electrical data signal. Additionally, or alternatively, tributary modulator 306 may receive a control signal via a feedback loop, and may adjust the operating condition of the modulator using the control signal. For example, tributary modulator 306 may combine the data signal and the control signal to modulate the input signal. Tributary modulator 306 may tap off the modulated signal to a monitor photo-detector of detector 308.

Modulator 304 may include multiple tributary modulators 306, and the signals generated by each tributary modulator 306 may be combined by modulator 304 to produce an output signal. For example, modulator 304 may include a QAM modulator with two tributary modulators 306, one to modulate signals on the I channel, and one to modulate signals on the Q channel. Modulator 304 may combine the signals on the I and Q channels to generate the output signal. Additionally, or alternatively, modulator 304 may include a PM modulator with two tributary modulators 306, one to modulate signals at the X polarization, and one to modulate signals at the Y polarization. Modulator 304 may combine the signals at the X and Y polarizations to generate the output signal. Additionally, or alternatively, modulator 304 may include a DPQAM modulator with four tributary modulators 306, one to modulate signals at the XI channel, one to modulate signals at the XQ channel, one to modulate signals at the YI channel, and one to modulate signals at the YQ channel. Modulator 304 may be referred to as a "parent modulator" that combines signals from two or more tributary modulators 306.

In some implementations, multiple modulators 304 may be nested so that the output signal of a particular modulator 304 is included in the output signal for another modulator 304. For example, a combined output signal from a first I modulator and a first Q modulator may produce the output signal of an X modulator and an output signal from a second I modulator and a second Q modulator may produce the output signal of a Y modulator, and the outputs from the X modulator and the Y modulator may be combined into an output signal of a PM modulator to be transmitted over an optical network, as described in more detail below in connection with FIGS. 3B and 3C.

Detector 308 may include a device and/or circuitry capable of detecting a form of error in a modulated optical signal. For example, detector 308 may detect an optical power of the optical signal, after a first portion of the optical signal and a second portion of the optical signal are modulated by tributary modulators 306 to cause interference between the first portion of the optical signal and the second portion of the optical signal. In some implementations, device 300 may include an interference device, such as one or more phase shifters, polarization rotators, polarization beam combiners, polarization controllers, or polarizers, associated with causing the first portion of the optical signal to interfere with the second portion of the optical signal.

Detector 308 may pass an error signal, based on the detected error, to a controller 310. For example, detector 308 may provide the error signal to indicate the optical power of the optical signal at one or more time-samples. In some implementations, detector 308 may include a low-speed (e.g., a less than approximately 100 Megabits per second (Mbits/s) detector). Additionally, or alternatively, detector 308 may include a high-speed detector (e.g., a greater than approximately 100 Mbits/s detector).

Controller 310 may include a device and/or circuitry capable of controlling properties of tributary modulator 306 and/or a signal generated by tributary modulator 306. For example, controller 310 may determine a skew associated with an optical signal based on a set of optical power measurements performed by detector 308, and may generate a control signal to adjust tributary modulators 306 to compensate for the skew. In some implementations, controller 310 may control the properties using a feedback loop. For example, controller 310 may receive a first error signal from detector 308, may generate a first control signal based on the first error signal, and may provide the first control signal to control the properties of tributary modulator 306, and may receive a second error signal after controlling the properties of tributary modulator 306, generate a second control signal based on the second error signal, and provide the second control signal to further control tributary modulator 306. In this case, the control signal may include a delay signal to cause a delay circuit of tributary modulator 306 to reduce a time misalignment between the X channel and the Y channel.

In some implementations, controller 310 may include a training pattern generator that may be utilized to select and/or generate a training pattern that is applied to the optical signal. For example, controller 310 may select a PRBS training pattern, an "m0m1" training pattern, or the like, and may cause tributary modulator 306 to apply the training pattern. In some implementations, controller 310 may include a data structure for determining a skew value. For example, controller 310 may include a look-up table associated with determining a skew value from an observed optical power generated when providing an optical signal with a particular training pattern. In some implementations, controller 310 may cause multiple skew detections and alignments to be performed. For example, controller 310 may determine a fine skew value (e.g., a skew value for a relatively small quantity of unit intervals) and a coarse skew value (e.g., a skew value for a relatively large quantity of unit intervals), and may compensate for skew based on the fine skew value and the coarse skew value.

The control signal may be transmitted to tributary modulator 306, may be combined with the data signal, and may be used to modulate the input signal. Example properties that may be controlled using the control signal include a bias point of tributary modulator 306, a phase difference between signals produced by multiple tributary modulators 306, a polarization orthogonality of signals produced by multiple tributary modulators 306, a voltage swing used by tributary modulator 306 to generate a signal, or other properties of one or more optical signals and/or one or more tributary modulators 306.

Device 300 may be implemented using free-space optics, fiber optics, integrated optics (e.g., Si, SiN, Silica, III-V, etc. optics), or the like.

FIG. 3B is a diagram of another example device 350 in which systems and/or methods described herein may be implemented. For example, device 350 may correspond to modulator 304 of device 300, a portion of modulator 304 of device 300, or the like. Device 350 may include a beam splitter 352, an X channel modulator 354, a Y channel modulator 356, a phase shifter 370, a photo-detector 372, a polarization rotator 374, and a polarization beam combiner 376. X channel modulator 354 may include an I channel modulator 358, a Q channel modulator 360, and an X channel phase shifter 362. Y channel modulator 356 may include an I channel modulator 364, a Q channel modulator 366, and a Y channel phase shifter 368.

In some implementations, device 350 may correspond to modulator 304, and X channel modulator 354 and Y channel modulator 356 may correspond to tributary modulators 306. Additionally, or alternatively, X channel modulator 354 may correspond to modulator 304, and I channel modulator 358 and Q channel modulator 360 may correspond to tributary modulators 306. Additionally, or alternatively, Y channel modulator 356 may correspond to modulator 304, and I channel modulator 364 and Q channel modulator 366 may correspond to tributary modulators 306.

Device 350 may receive an input optical signal (e.g., a lightbeam), which may be received by beam splitter 352. Beam splitter 352 may split the input optical signal into (at least) two paths. X channel modulator 354 and Y channel modulator 356 may each receive an optical signal on a respective one of the paths, and may modulate each optical signal using an electrical driving signal using modulators 358, 360, 364, and 366 to each produce an output optical signal.

The output optical signal from at least one of the tributary channels (e.g., from Q channel modulator 360, from Q channel modulator 366, or the like) may be phase shifted to a particular phase with respect to another tributary channel by a phase shifter, such as X channel phase shifter 362, Y channel phase shifter 368, or the like. For example, an output optical signal of Q channel modulator 360 may be phase shifted by X channel phase shifter 362 with respect to another output optical signal of I channel modulator 358. In some implementations, X channel phase shifter 362 and/or Y channel phase shifter 368 may apply a particular phase shift (e.g., a 0 degree phase shift, a 180 degree phase shift, or the like) to one of an XI channel or an XQ channel and/or one of a YI channel or a YQ channel, respectively.

The output optical signal from at least one of the paths (e.g., from Y channel modulator 356) may be phase shifted to a particular phase with respect to another output optical signal from at least one of the other paths (e.g., from X channel modulator 354) by phase shifter 370. Photo-detector 372, which may correspond to detector 308, may determine a combined optical power of an output of X channel modulator 354 and an output Y channel modulator 356.

The output optical signal from at least one of the paths (e.g., from Y channel modulator 356) may be rotated to a particular polarization by polarization rotator 374. Polarization rotator 374 may rotate the output optical signal from at least one of the paths such that the output signal from X channel modulator 354 and the output signal from Y channel modulator 356 are orthogonal (or approximately orthogonal). Polarization beam combiner 376 may combine the orthogonal modulated optical signals to produce an optical signal with a combined polarization.

FIG. 3C is a diagram of another example device 380 in which systems and/or methods described herein may be implemented. For example, device 380 may correspond to modulator 304 of device 300 or a portion of modulator 304. Device 380 may include beam splitter 352, X channel modulator 354, Y channel modulator 356, polarization rotator 374, polarization beam combiner 376, a polarization controller 382, a polarizer 384, and a photo-detector 372. Device 380 is configured similar to device 350; however, device 380 may utilize polarization controller 382 and polarizer 384 to alter a polarization of the output of polarization beam combiner 376. Photo-detector 372, which may correspond to detector 308, may receive output of polarizer 384 and perform a power measurement on the output of polarizer 384.

The number and arrangement of devices and components shown in FIGS. 3A-3C are provided as an example. In practice, there may be additional devices or components, fewer devices or components, different devices or components, or differently arranged devices or components than those shown in FIGS. 3A-3C. Furthermore, two or more devices or components shown in FIGS. 3A-3C may be implemented within a single device or component, or a single device or component shown in FIG. 3A-3C may be implemented as multiple, distributed devices or components. Additionally, or alternatively, a set of devices (e.g., one or more devices) or components of FIGS. 3A-3C may perform one or more functions described as being performed by another set of devices or components of FIGS. 3A-3C.

Components of FIGS. 3A-3C may include electrical circuits, optical circuits, or a combination of electrical circuits and optical circuits.

Figure 4:
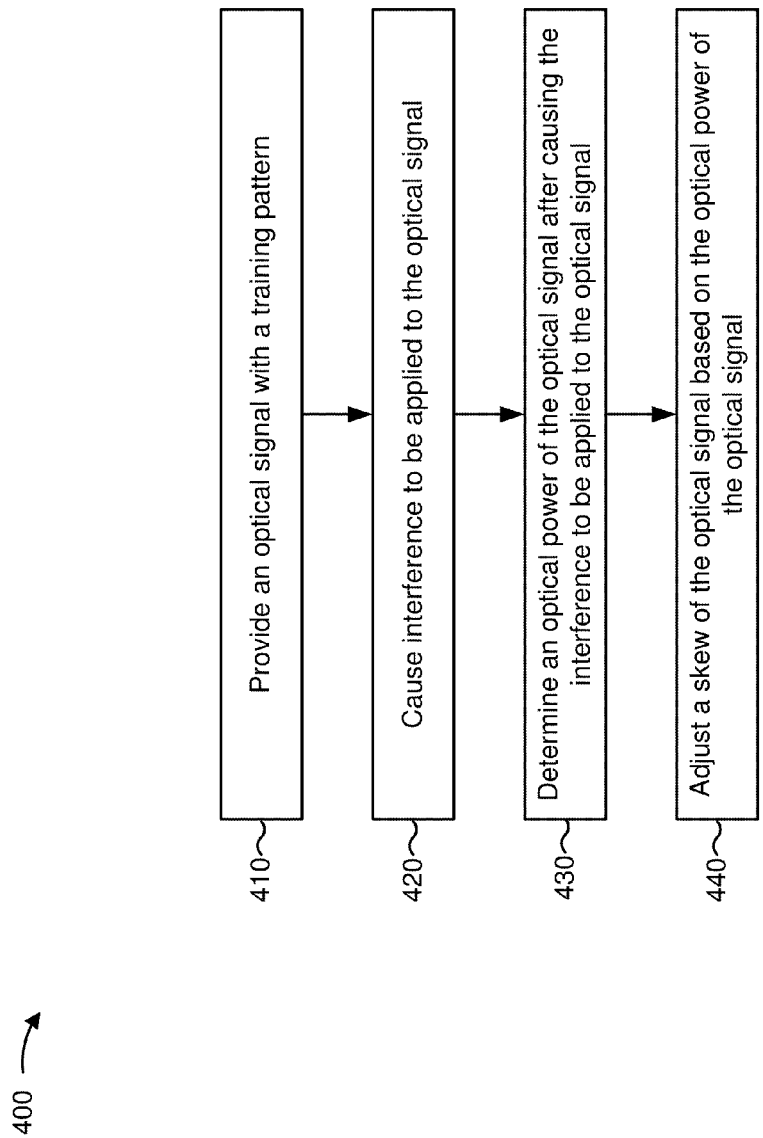
FIG. 4 is a flow chart of an example process for detection and alignment of XY skew at different unit intervals.

FIG. 4 is a flow chart of an example process 400 for detection and alignment of XY skew at different unit intervals. In some implementations, one or more process blocks of FIG. 4 may be performed by device 300. In some implementations, one or more process blocks of FIG. 4 may be performed by one or more components of another device (e.g., device 350, device 380, modulator 304, etc.) or a collection of devices.

Figure 5:
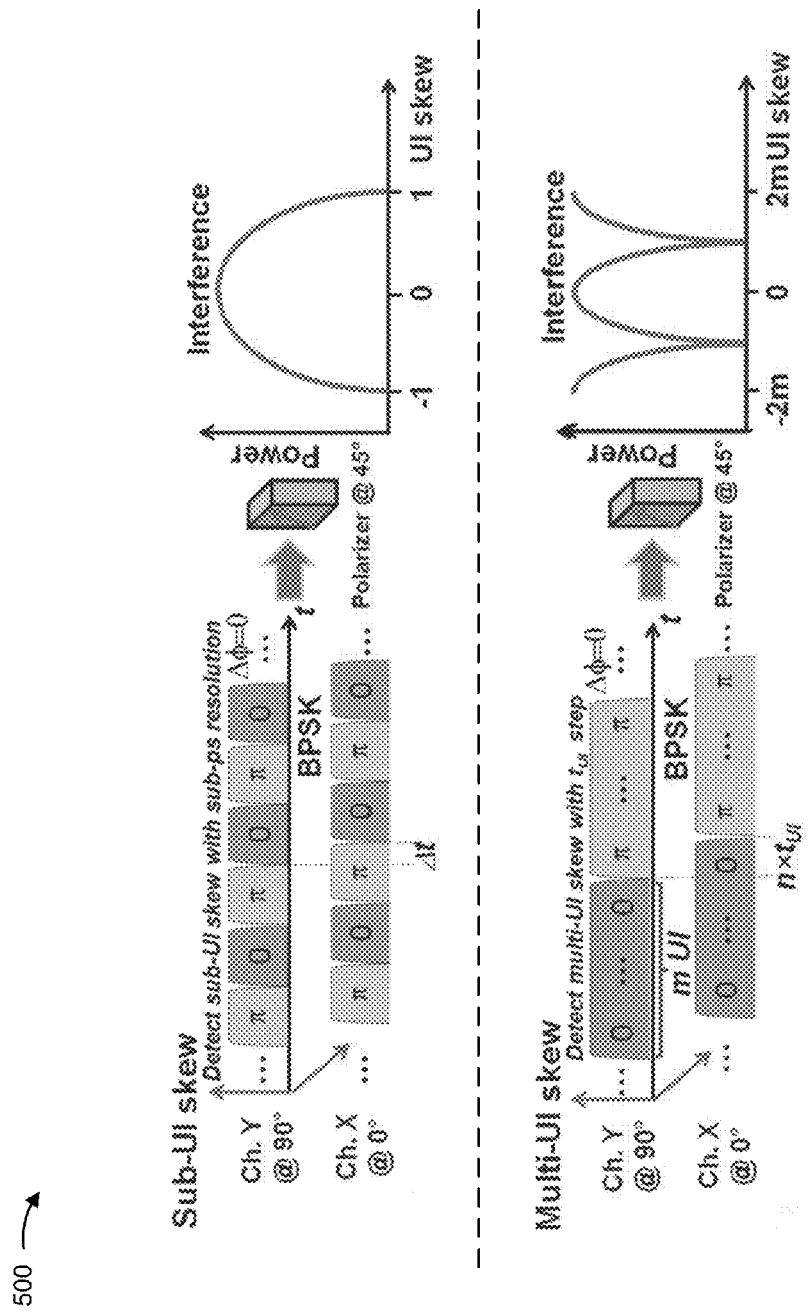
FIG. 5 is a diagram of an example implementation relating to the example process shown in FIG. 4.

FIG. 5 is a diagram of an example implementation 500 relating to example process 400 shown in FIG. 4. FIG. 5 shows an example of detection and alignment of XY skew at different unit intervals. FIG. 4 will be described with reference to FIG. 5.

As shown in FIG. 4, process 400 may include providing an optical signal with a training pattern (block 410). For example, device 300 may provide the optical signal with the training pattern. In some implementations, device 300 may activate or de-active one or more tributary channels when providing the optical signal. For example, device 300 may activate one tributary channel of the X channel (e.g., the XI channel or the XQ channel) and a corresponding one tributary of the Y channel (e.g., the YI channel or the YQ channel).

In some implementations, device 300 may generate the training pattern for the optical signal. For example, device 300 may generate the training pattern at a data rate corresponding to a data rate at which the optical signal is configured to operate within an optical network (e.g., 100 Mbits/s, 1000 Mbits/s, or the like). In some implementations, device 300 may provide the optical signal with a PRBS training pattern. For example, device 300 may apply the PRBS training pattern to the optical signal. In some implementations, device 300 may provide the optical signal with an "m0m1" training pattern. For example, as shown in FIG. 5 for sub-UI skew, device 300 may provide the optical signal with a "01" pattern (e.g., a training pattern for m=1). The "01" pattern may include providing an optical signal (e.g., a DPQAM signal, a DPBPSK signal, etc.) with alternating values of "0" and "π" encoded in the X tributary channel (e.g., "0π0π . . . ") and alternating values of "0" and "π" encoded in the Y tributary channel. Additionally, or alternatively, as shown in FIG. 5 for multi-UI skew, device 300 may provide the optical signal with a consecutive repeating training pattern (e.g., a training pattern for m>1). The consecutive repeating training pattern may include a set of m "0's" and m "π's" encoded in the X tributary channel (e.g., "00ππ00ππ . . . ," "000πππ000πππ," or the like) and a set of a set of m "0's" and m "π's" encoded in the Y tributary channel.

As shown in FIG. 5, device 300 may provide the training pattern with a particular quantity of skew that is to be determined and controlled by device 300. For example, with regard to sub-UI skew, device 300 may provide the training pattern with a skew of $\Delta t$ between the X channel and the Y channel. As another example, with regard to multi-UI skew, device 300 may provide the training pattern with a skew of $n*t_{ui}$ between the X channel and the Y channel.

As further shown in FIG. 4, process 400 may include causing interference to be applied to the optical signal (block 420). For example, device 300 may apply the interference to the optical signal using a polarizer, a polarization beam splitter, or the like. In some implementations, device 300 may configure a phase shifter when applying the interference to the optical signal. For example, as shown in FIG. 5 with regard to sub-UI skew and multi-UI skew, device 300 may configure the phase shifter to provide the X channel at a 0 degree phase difference compared with the Y channel (not accounting for skew between the X channel and the Y channel) (e.g., "$\Delta\phi=0$" (radians)). In this way, device 300 may identify a skew that alters the 0 degree phase difference, based on interference between the X channel and the Y channel to an optical power failing to match an expected interference to the optical power.

As further shown in FIG. 4, process 400 may include determining an optical power of the optical signal after causing the interference to be applied to the optical signal (block 430). For example, device 300 may determine the optical power of the optical signal after applying interference to the optical signal. As shown in FIG. 5, for sub-UI skew, a power transfer function is determined with a period of two UI, from which a sub-UI skew value is obtained (e.g., based on comparing the power transfer function to a de-skewed power transfer function for the training pattern stored in a look-up table). Similarly, as shown in FIG. 5 for multi-UI skew, a power transfer function is determined with a period of 2m-UI, from which a multi-UI skew value is obtained.

As further shown in FIG. 4, process 400 may include adjusting a skew of the optical signal based on the optical power of the optical signal (block 440). For example, device 300 may generate a control signal to adjust the skew of the optical signal based on the skew value (e.g., determined based on the optical power of the optical signal). In some implementations, device 300 may provide the control signal to a delay circuit of a modulator of device 300 to adjust the skew. For example, device 300 may generate the control signal to reduce a time misalignment between the X channel and the Y channel, and may provide the control signal to X channel modulator 354 or Y channel modulator 356 to reduce the time misalignment.

In some implementations, device 300 may generate a control signal to adjust the skew to a desired scenario (that may or may not utilize a reduced skew). For example, device 300 may, for a pluggable optics application, generate a control signal that causes the skew to be adjusted to a well-aligned scenario (e.g., a skew reduced to satisfy a threshold), an interleaved scenario (e.g., polarization interleaving, which may reduce a transmission penalty), or the like.

In some implementations, device 300 may utilize a control loop to adjust the skew of the optical signal. For example, device 300 may provide the control signal to adjust the skew and may perform another optical power measurement to determine whether the skew is reduced to a level that satisfies a threshold. In some implementations, device 300 may determine that the skew is reduced to a threshold level for transmitting information via an optical network. For example, device 300 may determine that the skew is reduced to the level satisfying the threshold for the optical network in which device 300 is operating, and may facilitate transmission of optical signals carrying information (other than the training pattern) based on determining that the skew is reduced to the acceptable level of skew.

In some implementations, device 300 may alter a mode to provide one or more other optical signals for transmission. For example, device 300 may, based on determining that the skew satisfies a threshold level, operate to provide information to an optical fiber for transmission via an optical network. In some implementations, device 300 may determine that the skew does not satisfy the threshold level (e.g., based on monitoring one or more optical signals, based on receiving feedback from a receiver, or the like), and may enter a configuration mode to reduce the skew to satisfy the threshold level.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As indicated above, FIG. 5 is provided merely as an example. Other examples are possible and may differ from what was described with regard to FIG. 5.

Figure 6:
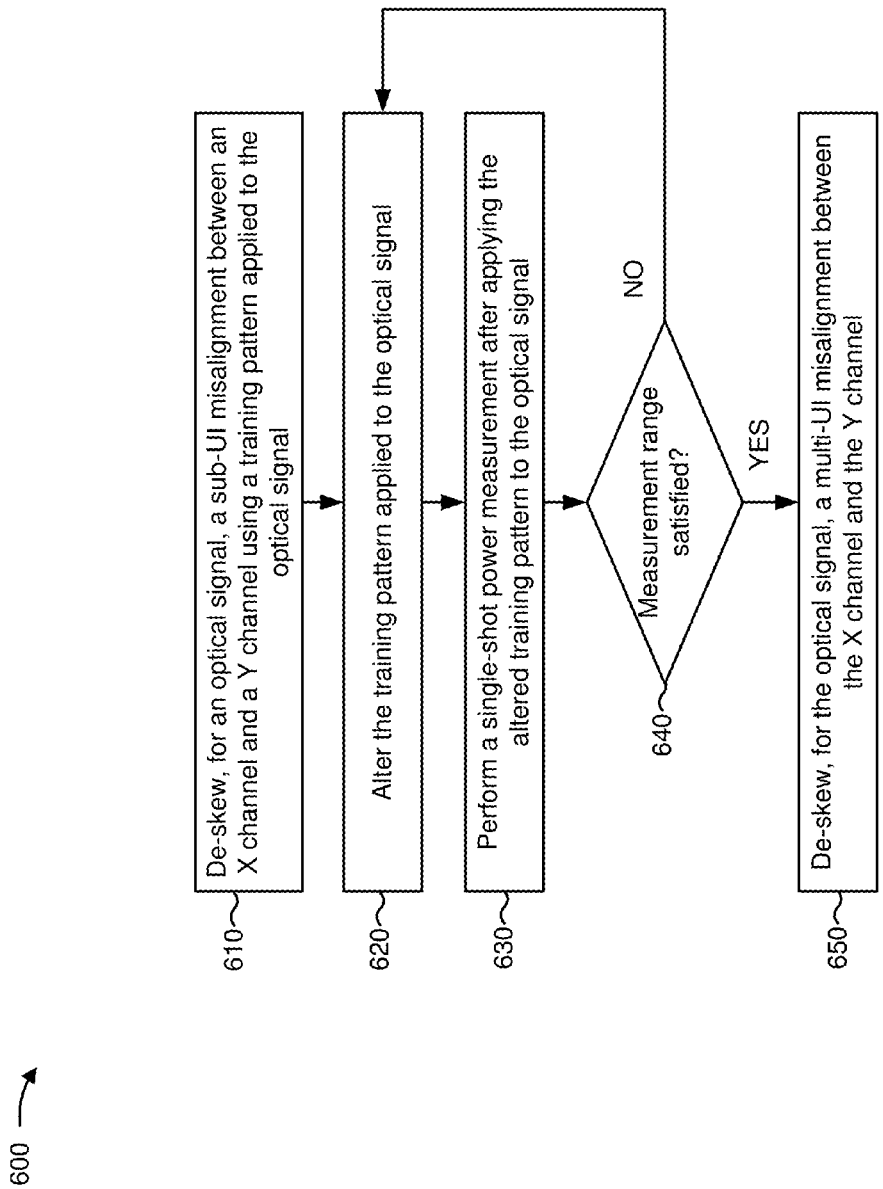
FIG. 6 is a flow chart of an example process for detection and alignment of arbitrary XY skew.
Figure 7:
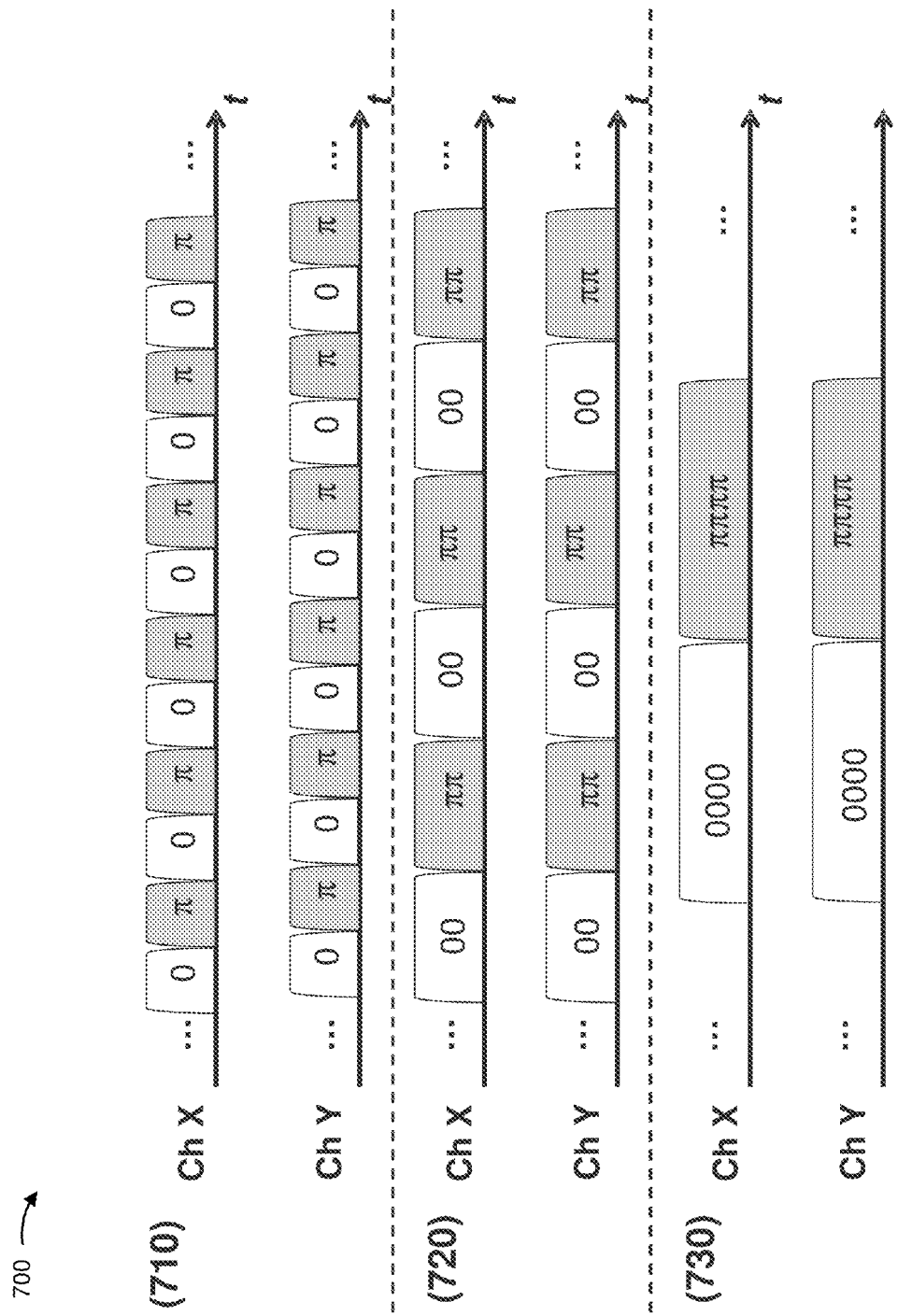
FIG. 7 is a diagram of an example implementation relating to the example process shown in FIG. 6.

FIG. 6 is a flow chart of an example process 600 for detection and alignment of arbitrary XY skew. In some implementations, one or more process blocks of FIG. 6 may be performed by device 300. In some implementations, one or more process blocks of FIG. 6 may be performed by one or more components of another device (e.g., device 350, device 380, modulator 304, etc.) or a collection of devices. FIG. 7 is a diagram of an example implementation 700 relating to example process 600 shown in FIG. 6. FIG. 7 shows an example of detection and alignment of arbitrary XY skew. FIG. 6 will be described with reference to FIG. 7.

As shown in FIG. 6, process 600 may include de-skewing, for an optical signal, a sub-UI misalignment between an X channel and a Y channel using a training pattern applied to the optical signal (block 610). For example, device 300 may perform skew detection and alignment of the optical signal at a sub-UI skew (e.g., using a "01" training pattern). As shown in FIG. 7, and by reference number 710, device 300 may utilize the "01" training pattern to de-skew the optical signal at a sub-UI level, and may generate a control signal to de-skew the sub-UI skew, as described herein with regards to FIGS. 4 and 5.

As further shown in FIG. 6, process 600 may include altering the training pattern applied to the optical signal (block 620). For example, device 300 may alter the training pattern that is applied to the optical signal to perform sub-UI de-skewing. In some implementations, device 300 may alter the training pattern by adding one or more consecutive values to the training pattern. For example, as shown in FIG. 7, and by reference number 720, device 300 may double a quantity of consecutive values of the training pattern (the "01" pattern) to generate an altered training pattern (a "0011" pattern).

As further shown in FIG. 6, process 600 may include performing a single-shot power measurement after applying the altered training pattern to the optical signal (block 630). For example, device 300 may perform the single-shot power measurement of the optical signal after applying the altered training pattern. A single-shot power measurement may refer to a power measurement performed using a single-shot cross-correlator to determine an optical power measurement. By performing single-shot power measurement, device 300 may facilitate detection of quasi-UI skew (e.g., quasi even UI skew, quasi odd UI skew, etc.). For example, device 300 may perform a single-shot power measurement to determine a minimum power value, a maximum power value, or the like of the optical signal.

As further shown in FIG. 6, process 600 may include determining whether a measurement range is satisfied (block 640). For example, device 300 may determine whether the measurement range is satisfied. The measurement range may be satisfied when the measurement range is sufficient to detect a misalignment between the X channel and the Y channel at a particular magnitude of UI skew. In some implementations, device 300 may determine that the measurement range is satisfied based on detecting the misalignment between the X channel and the Y channel. For example, device 300 may detect a power level, measured using the single-shot power measurement, failing to correspond to an expected power level. In some implementations, device 300 may determine that the measurement range is not satisfied based on failing to detect the misalignment between the X channel and the Y channel. For example, the power level may fail to resolve to a particular level of skew.

As further shown in FIG. 6, process 600 may include determining that the measurement range is not satisfied (block 640—NO) and altering the training pattern applied to the optical signal (block 620). For example, device 300 may determine that the measurement range is not sufficient to detect the misalignment between the X channel and the Y channel, and may alter the training pattern. As shown in FIG. 7, and by reference number 730, device 300 alters the second training pattern (e.g., the "0011" pattern) to a third training pattern (e.g., a "00001111" pattern). Device 300 may continue to alter the training pattern and perform single-shot power measurements until the measurement range is satisfied, in some implementations. In this way, device 300 may double a measurement range for detecting skew each iteration of doubling the m value for the training pattern and performing another single-shot power measurement. Moreover, device 300 may reduce a time required to align arbitrary (e.g., not previously known) XY skew of an optical signal and improve resolution for the alignment relative to another technique, thereby improving optical communications.

As further shown in FIG. 6, process 600 may include determining that the measurement range is satisfied (block 640—YES) and de-skewing, for the optical signal, a multi-UI misalignment between the X tributary channel and the Y tributary channel (block 650). For example, device 300 may identify the X channel and Y channel misalignment from the single-shot power measurement and generate a control signal to de-skew the optical signal.

In this way, device 300 may facilitate detection and alignment of arbitrary XY skew with a reduced detection time and an improved detection resolution relative to one or more other XY skew detection and alignment techniques.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As indicated above, FIG. 7 is provided merely as an example. Other examples are possible and may differ from what was described with regard to FIG. 7.

Figure 8A:
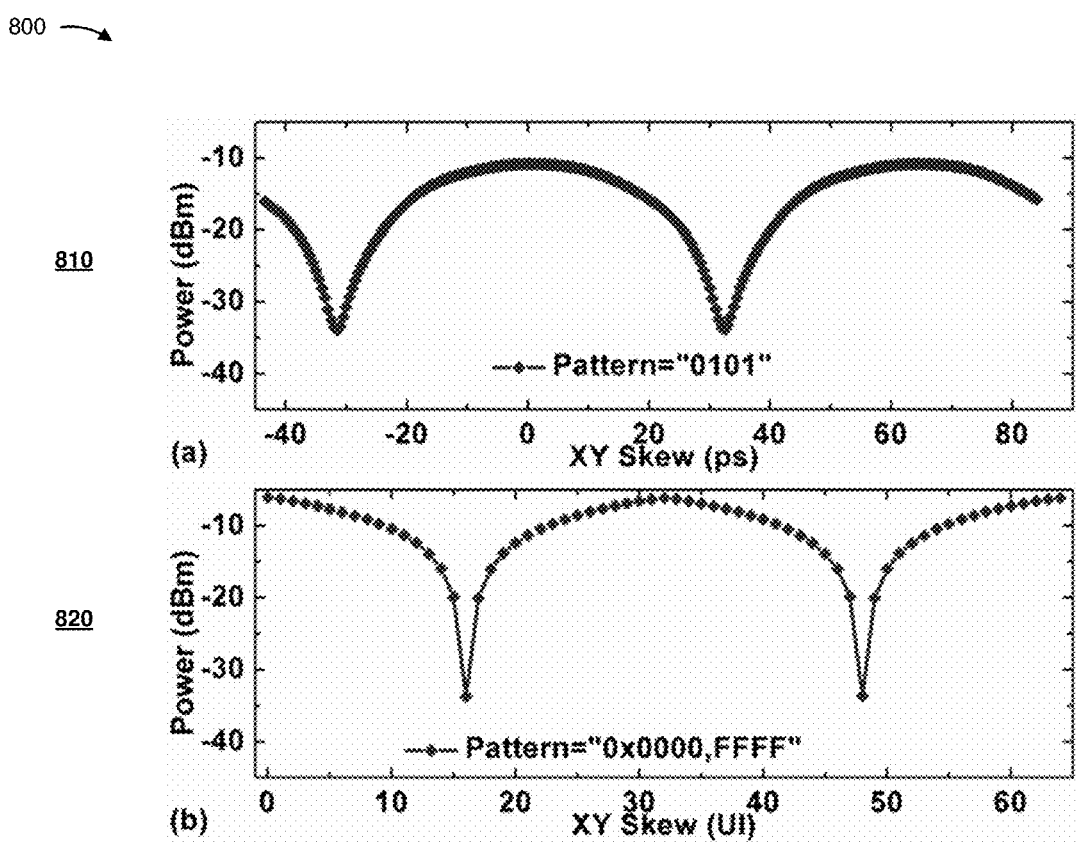
FIGS. 8A-8C are diagrams illustrating example results relating to the example process shown in FIG. 4 and the example process shown in FIG. 6.
Figure 8B:
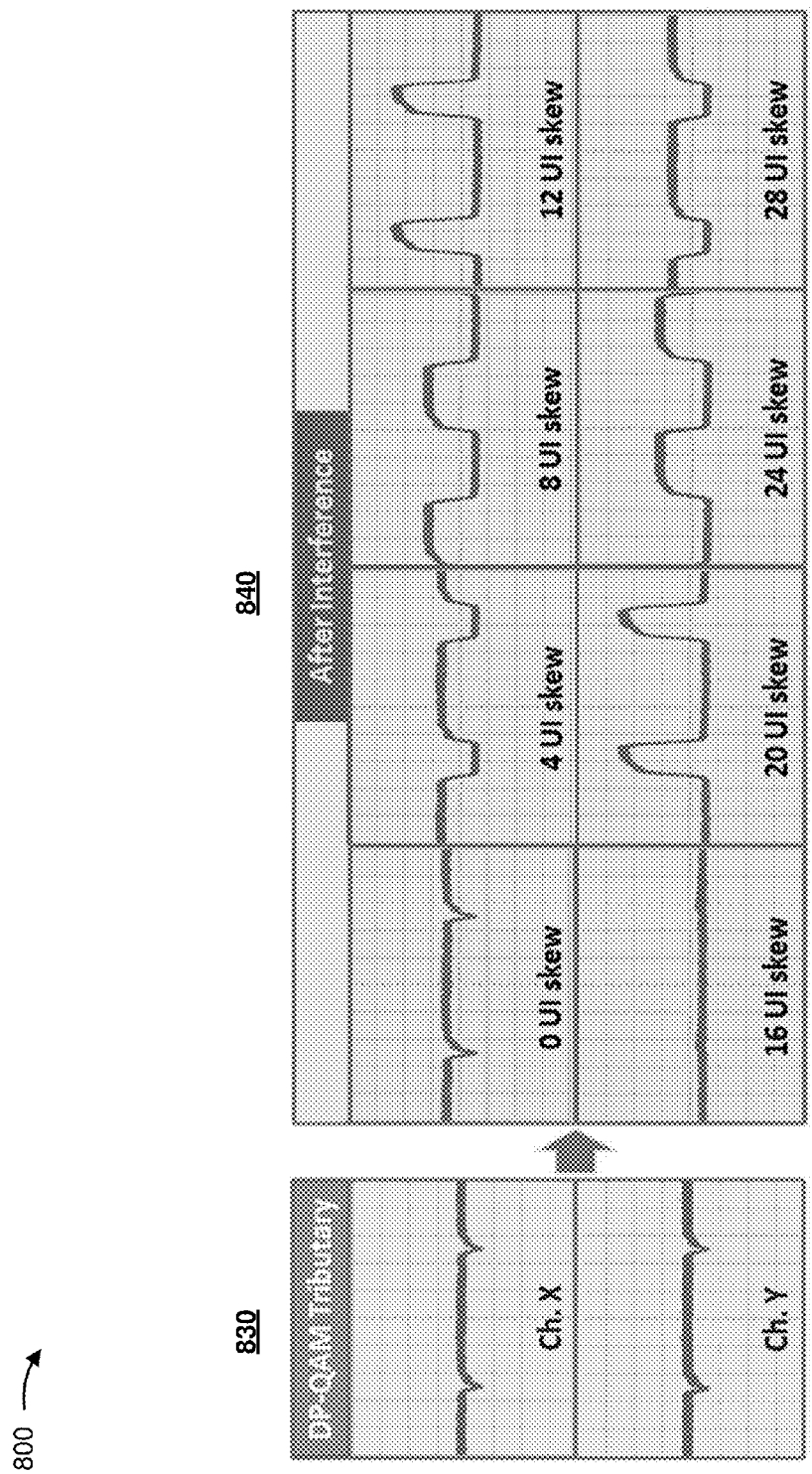
Figure 8C:
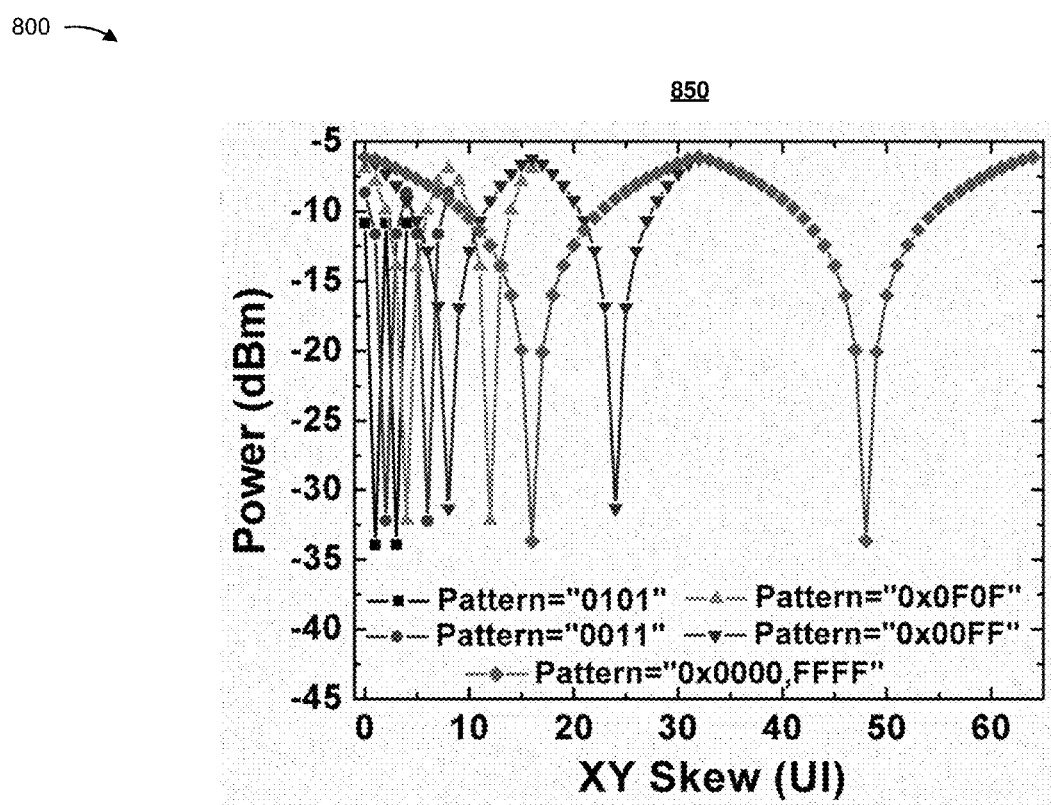

FIGS. 8A-8C are diagrams of an example illustration 800 illustrating example results relating to the example process shown in FIG. 4 and the example process shown in FIG. 6.

As shown in FIG. 8A, device 300 performs skew determination for an optical signal. As shown by reference number 810, device 300 utilizes a "01" training pattern (e.g., "0101" when repeated). The period of the power transfer function detected by device 300 is approximately 63 picoseconds (ps). Device 300 may observe a dynamic optical power range of approximately 23.2 decibels (dB) with a power change of approximately 1.5 dB for a 1 picosecond (ps) skew from alignment. As shown by reference number 820, device 300 utilizes an "m0m1" training pattern with m=16 (e.g., "0x0000,FFFF" pattern). Device 300 may observe a 27.6 dB dynamic optical power range for detection of up to 32 UI skew.

As shown in FIG. 8B, and by reference number 830, device 300 generates a waveform utilizing an "m0m1" training pattern with different m values ordered consecutively (e.g., "0, 1, 00, 11, 000, 111, . . . "). As shown by reference number 840, after applying interference (e.g., via a polarizer), device 300 may identify an optical power variation associated with a periodicity of 32-UI for the X channel and the Y channel.

As shown in FIG. 8C, and by reference number 850, device 300 may determine a power transfer function for a set of possible training patterns applied to an optical signal. For example, device 300 may generate a "01" pattern, an "m0m1" pattern with m=2 ("0011"), an "m0m1" pattern with m=4 ("0x0F0F"), an "m0m1" pattern with m=8 ("0x00FF"), or "m0m1" pattern with m=16 ("0x0000, FFFF"). Other patterns are possible that differ from those described herein. As shown in FIG. 8C, as m increases for a training pattern, a skew size (in UI) that may be detected using the training pattern increases accordingly.

As indicated above, FIGS. 8A-8C are provided merely as an example. Other examples are possible and may differ from what was described with regard to FIGS. 8A and 8B.

In this way, device 300 may facilitate skew detection and alignment for an X channel and Y channel optical signal, thereby facilitating optical communication via the optical signal.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical device, comprising:
 a transmitter to provide an optical signal; and
 a modulator comprising:
  two or more tributary modulators to modulate an X polarization channel (X channel) and a Y polarization channel (Y channel) of the optical signal with a training pattern at a first time period,
   the X channel including an in-phase channel (XI channel) and a quadrature channel (XQ channel),
   the Y channel including an in-phase channel (YI channel) and a quadrature channel (YQ channel);
  an interference device to cause the X channel to interfere with the Y channel,
   the interference device including at least one of:
    a phase shifter,
    a polarization rotator,
    a polarization beam combiner,
    a polarization controller, or
    a polarizer;
  a detector to determine an optical power measurement of the optical signal after the X channel interferes with the Y channel,
   the optical power measurement being determined at a second time period after the first time period; and
  a controller to:
   calculate a skew associated with the optical signal based on the optical power measurement,
    the skew being associated with the second time period, and
    the skew being associated with a digital domain, an analog domain, and an optical domain of the optical device;
   generate a control signal to align the skew associated with the optical signal; and provide the control signal to a tributary modulator, of the two or more tributary modulators, to alter a modulation of the optical signal.

2. The optical device of claim 1, where the modulator further comprises:
a delay circuit to:
receive the control signal, and
apply a delay to the X channel or the Y channel to align the skew.

3. The optical device of claim 1, where the two or more tributary modulators are further configured to:
provide the optical signal with the training pattern via the XI channel and the YI channel.

4. The optical device of claim 1, where the two or more tributary modulators are further configured to:
provide the optical signal with the training pattern via the XQ channel and the YQ channel.

5. The optical device of claim 1, where the training pattern is selected to detect:
a sub-unit interval skew, and/or
a multi-unit interval skew.

6. The optical device of claim 1, where the controller is further configured to:
generating a generate the control signal to:
reduce the skew of the X channel and the Y channel, or interleave the X channel and the Y channel.

7. The optical device of claim 1, where the modulator is to:
modulate the optical signal based on:
a dual-polarization binary phase shift keying, and/or
a dual-polarization quadrature amplitude modulation.

8. The optical device of claim 1, where the controller is further configured to:
determine that a measurement range associated with the training pattern is insufficient to detect the skew; and
cause the training pattern to be altered to increase the measurement range.

9. The optical device of claim 1, where the controller is further configured to:
determine that an XY skew of the optical signal satisfies a threshold; and
facilitate transmission of information based on determining that the XY skew of the optical signal satisfies the threshold.

10. A device, comprising:
an optical source to provide an optical signal; and
a parent modulator comprising:
an X polarization channel (X channel) modulator;
a Y polarization channel (Y channel) modulator,
the X channel modulator and Y channel modulator being to modulate an X channel and a Y channel of the optical signal with a training pattern at a first time period;
an interference device to cause the X channel to interfere with the Y channel,
the interference device including at least one of:
a phase shifter,
a polarization rotator,
a polarization beam combiner,
a polarization controller, or
a polarizer;
a detector to determine an optical power measurement of the optical signal after the X channel interferes with the Y channel,
the optical power measurement being determined at a second time period after the first time period; and a control device to:
calculate a skew associated with the optical signal based on the optical power measurement,
the skew being associated with the second time period, and
the skew being associated with a digital domain, an analog domain, and an optical domain of the device;
generate a control signal to align the skew associated with the optical signal; and
provide the control signal to one of the X channel modulator or the Y channel modulator to alter a modulation of the optical signal.

11. The device of claim 10, where the X channel modulator further comprises:
an in-phase channel (I channel) modulator; and
a quadrature channel (Q channel) modulator.

12. The device of claim 10, where the Y channel modulator further comprises:
an in-phase channel (I channel) modulator; and
a quadrature channel (Q channel) modulator.

13. The device of claim 10, where the control device is further configured to:
determine that an XY skew of the optical signal satisfies a threshold; and
facilitate transmission of information based on determining that the XY skew of the optical signal satisfies the threshold.

14. The device of claim 10, where the interference device is further configured to:
cause a portion of the X channel of the optical signal to interfere with a portion of the Y channel of the optical signal; and
where the detector is further to:
perform a power measurement of the optical signal after the portion of the X channel interferes with the portion of the Y channel.

15. The device of claim 10, where the parent modulator is to:
modulate the optical signal based on at least one of:
a dual-polarization binary phase shift keying, or
a dual-polarization quadrature amplitude modulation.

16. The device of claim 10, where the parent modulator further comprises:
a delay circuit to:
receive the control signal, and
apply a delay to the X channel or the Y channel to align the skew.

17. An optical device, comprising:
a modulator to:
receive an optical signal;
modulate the optical signal to include a first channel and a second channel;
modulate the optical signal, at a first time period, based on a training pattern associated with detecting a skew;
cause the first channel to interfere with the second channel;
determine a power measurement of the optical signal after the first channel interferes with the second channel,
the power measurement being determined at a second time period after the first time period;
determine the skew associated with the optical signal based on the power measurement and the training pattern, the skew being associated with the second time period, and the skew being associated with a digital domain, an analog domain, and an optical domain of the optical device;

generate a time delay to align the skew associated with the optical signal; and provide the time delay to the first channel or the second channel to alter a modulation of the optical signal.

18. The optical device of claim 17, where the first channel is a first polarization channel, the second channel is a second polarization channel, and the skew is a polarization skew; and where the modulator is further configured to:

configure an interference device, such that the first polarization channel and the second polarization channel interfere when combined; and combine the first polarization channel and the second polarization channel.

19. The optical device of claim 17, where the first channel is a first polarization channel, the second channel is a second polarization channel, and the skew is a polarization skew; and where the modulator is further configured to:

determine that the first polarization channel and the second polarization channel are aligned to within a threshold level; and provide one or more optical signals for transmission based on determining that the first polarization channel and the second polarization channel are aligned to within the threshold level.

20. The optical device of claim 17, where the optical signal is modulated based on:

a dual-polarization (DP) quadrature amplitude modulation format, a DP phase shift keying format, a DP binary phase shift keying format, a DP pulse-amplitude format, a DP on-off keying format, a DP pulse-position format, a DP return-to-zero format, a DP non-return-to-zero format, and/or a polarization shift keying format.

* * * * *